US008696290B2

(12) United States Patent
Shoemaker

(10) Patent No.: US 8,696,290 B2
(45) Date of Patent: Apr. 15, 2014

(54) IMPLEMENT FOR TRANSPORTING AND WRAPPING LARGE BALES

(75) Inventor: John Shoemaker, Ebensburg, PA (US)

(73) Assignee: CNH Ameica, LLC, New Holland, PA (US)

(*) Notice: Subject to any disclaimer, the term of this patent is extended or adjusted under 35 U.S.C. 154(b) by 574 days.

(21) Appl. No.: 12/835,769

(22) Filed: Jul. 14, 2010

(65) Prior Publication Data

US 2011/0014014 A1 Jan. 20, 2011

Related U.S. Application Data

(60) Provisional application No. 61/225,801, filed on Jul. 15, 2009.

(51) Int. Cl.
*A01F 25/14* (2006.01)
*A01D 90/00* (2006.01)

(52) U.S. Cl.
USPC ............... 414/111; 53/567; 53/576; 414/439; 414/491

(58) Field of Classification Search
USPC .......... 180/14.3; 198/312, 314; 280/420–421; 294/61; 414/111, 24.5, 24.6, 471, 482, 414/485, 500, 501, 502, 505, 507, 514, 523, 414/527, 528, 537, 538, 546, 551, 553, 632, 414/633, 679, 812, 813, 911, 469, 494; 53/441, 443, 556, 588
See application file for complete search history.

(56) References Cited

U.S. PATENT DOCUMENTS

| | | | | |
|---|---|---|---|---|
| 3,204,797 A | * | 9/1965 | Chandler | 414/501 |
| 3,679,081 A | * | 7/1972 | Duncan, Jr. | 414/499 |
| 4,082,157 A | * | 4/1978 | Sternberg | 180/14.3 |
| 4,243,353 A | * | 1/1981 | Reed | 414/439 |
| 4,459,075 A | * | 7/1984 | Eichenberger | 414/24.5 |
| 4,594,836 A | * | 6/1986 | Good | 53/459 |
| 4,793,124 A | | 12/1988 | Anderson | 53/588 |
| 4,888,937 A | * | 12/1989 | Glenn | 53/567 |
| 5,700,124 A | | 12/1997 | Dufraise | 414/111 |
| 5,829,233 A | * | 11/1998 | Stirling | 53/567 |
| 5,842,823 A | * | 12/1998 | Kohnen et al. | 414/111 |
| 6,089,003 A | * | 7/2000 | Frey | 53/591 |
| 2011/0014014 A1 | * | 1/2011 | Shoemaker | 414/24.5 |
| 2011/0014022 A1 | * | 1/2011 | Shoemaker et al. | 414/469 |

* cited by examiner

*Primary Examiner* — Gregory Adams

(57) ABSTRACT

An implement for transporting and wrapping large round bales of forage material includes an elongated transporter having longitudinally extending rails and an endless chain associated with each rail to move large bales of forage material rearwardly along the rails toward the bale wrapper connected to the rearward end of the transporter. The bale wrapper can be devoid of wheels and is carried between job sites on top of the transporter bed, being loaded and unloaded through use of the endless chains associated with each rail. The bale wrapper receives operative power from the transporter drive mechanism. A bale loader elevates round bales from the ground onto the rails. Once fully loaded, a push gate pushes the round bales rearwardly toward the bale wrapper.

20 Claims, 6 Drawing Sheets

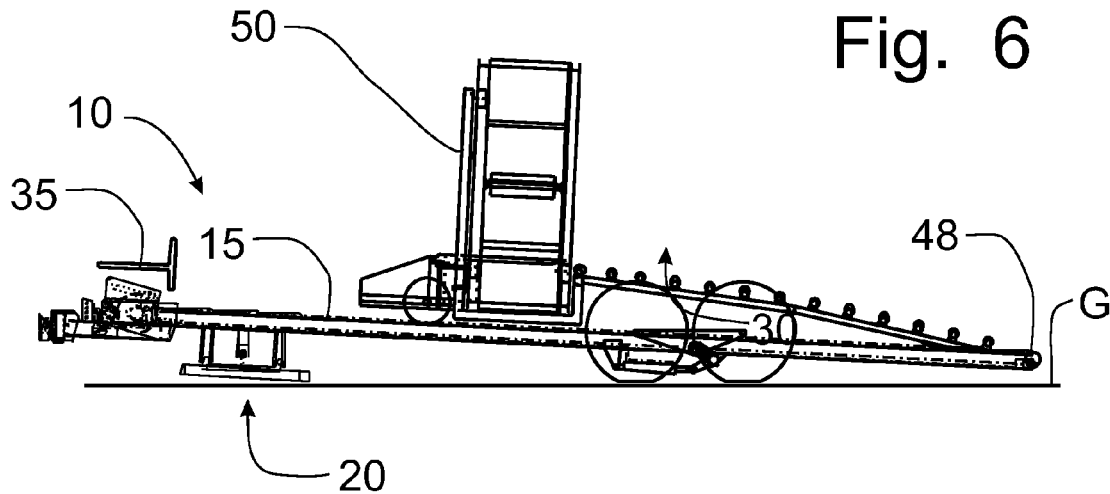
Fig. 6
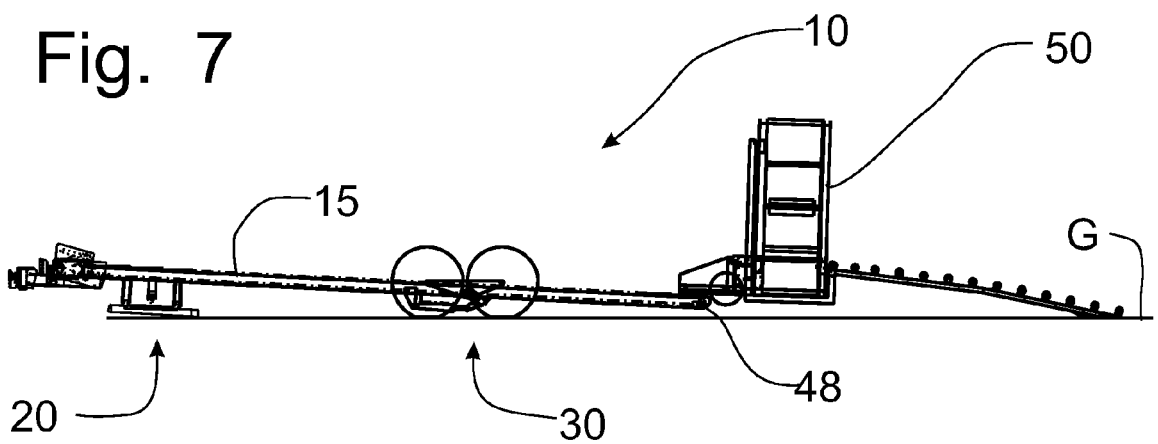
Fig. 7
Fig. 8

IMPLEMENT FOR TRANSPORTING AND WRAPPING LARGE BALES

CROSS-REFERENCE TO RELATED APPLICATIONS

This application claims domestic priority of U.S. Provisional Patent Application Ser. No. 61/225,801, filed Jul. 15, 2009, the content of which is incorporated herein by reference.

FIELD OF THE INVENTION

The present invention generally relates to apparatus for retrieving, wrapping and transporting large round bales of forage material and, more particularly, to a transporter machine cooperable with a wrapping mechanism to move and wrap large round bales of forage material.

BACKGROUND OF THE INVENTION

Another transporter apparatus can be found in U.S. Pat. No. 4,329,102, issued on May 11, 1982, to John H. Gray. The Gray transporter is similar to the Seymour transporter in that the round bales are engaged at the forward end of the machine and conveyed rearwardly to be transported in a linear configuration. The Gray transporter, however, is constructed with an offset bale pick-up mechanism that engages round bales to the side of the transporter and elevates them onto the transporter by pivoting the pick-up mechanism to move the bale from the ground onto the transporter. U.S. Pat. No. 5,071,304, issued to Vern L. Godfrey on Dec. 10, 1991, carries the collected round bales in a linear orientation above the surface of the ground, and picks up the bales by hydraulically lowering the entire transporter over the round bale before engaging and lifting the bale.

A two row transporter for round bales is shown in U.S. Pat. No. 5,700,124, granted on Dec. 23, 1997, to Charles Duffraisse. In this transporter, round bales are engaged by a pick-up mechanism located offset to the side of the transporter frame so that the pick-up mechanism will pivot to elevate a round bale from the ground onto the frame of the transporter where a pusher moves the round bales rearwardly until the first row of round bales is formed. A second pusher apparatus is then operated to move the entire row of round bales from the first position to a transversely spaced second position. The first row of round bales is then filled again to provide a two row transporter configuration for transport from the field to a remote location. This particular transporter has been coupled commercially with the spiral round bale wrapper apparatus disclosed in U.S. Pat. No. 4,793,124 with the first row of bales being fed through the circular hoop followed by the second row after being moved back onto the first row position.

In this commercial configuration, the transporter is powered by the tractor that provides motive and operative power to the transporter, but the wrapper mechanism is powered by its own on-board engine to operate independently of the transporter and the tractor. However, in the specification of U.S. Pat. No. 5,700,124, an automatic coupling device is suggested as being available to hydraulically couple the wrapper apparatus to the hydraulic system of the tractor connected to the transporter. Certainly, a manual connection of hydraulic hoses from the tractor to the wrapper apparatus is possible, although such manual operation requires the operator of the tractor to dismount from the tractor and manually connect the hydraulic hoses to the connecting ports of the wrapper apparatus.

It would also be desirable to provide a transporter apparatus that would be operable to be coupled to a wrapping machine to cause the bales being transported to be spiral wrapped with a plastic strip such that the power for operating the wrapping apparatus is provided from the tractor operating the transporter.

SUMMARY OF THE INVENTION

It is an object of this invention to overcome the disadvantages of the prior art by providing an implement for transporting and wrapping round bales of forage material where the bale wrapper receives operational power from the transporter conveying round bales from the field to the bale wrapper.

It is a feature of this invention that the transporter is formed with a pair of longitudinally extending rails on which round bales loaded onto the transporter are placed.

It is another feature of this invention that the bale wrapper can be devoid of wheels and is transported between job sites on the bed of the transporter.

It is still another feature of this invention that the large bale transporter can be coupled to a bale wrapper through which the large bales of forage material are passed directly from the transporter.

It is another feature of this invention that the bale wrapper is adapted for connection to the rear of the transporter when positioned to receive large bales therefrom.

It is yet another feature of this invention that the bale wrapper can be transported on the large bale transporter for movement from one location to another.

It is an advantage of this invention that the bale wrapper can be selectively positioned at a job site before the transporter is utilized to retrieve large bales of forage material to be wrapped thereby.

It is still another feature of this invention that the operative power to run the bale wrapping apparatus is provided by a drive connection with the large bale transporter.

It is another advantage of this invention that the bale wrapper can be manufactured without a power plant to drive the operation of the bale wrapping apparatus.

It is a further feature of this invention that the frame of the large bale transporter supports a chain mechanism that underlies the large bales when carried on the frame of the transporter.

It is still another feature of this invention that the large bale transporter can be operatively connected to a prime mover, such as a farm tractor, to provide motive power for moving the transporter over the surface of the ground.

It is yet another advantage of this invention that the prime mover can also provide the hydraulic power for operation of the drive mechanism on the large bale transporter.

It is another object of this invention to provide a large bale transporter and bale wrapper system for retrieving large bales of forage material from the ground after being baled by a conventional baling process to wrap the large bales with plastic for placement at a desired location, which is durable in construction, inexpensive of manufacture, carefree of maintenance, facile in assemblage, and simple and effective in use.

These and other objects, features and advantages are accomplished according to the instant invention by providing an implement for transporting and wrapping large round bales of forage material which includes an elongated transporter having longitudinally extending rails and an endless chain associated with each rail to move large bales of forage material rearwardly along the rails toward the bale wrapper connected to the rearward end of the transporter. The bale wrapper can be devoid of wheels and is carried between job sites on top of the transporter bed, being loaded and unloaded through use of the endless chains associated with each rail. The bale wrapper receives operative power from the transporter drive mechanism. A bale loader elevates round bales from the ground onto the rails. Once fully loaded, a push gate pushes the round bales rearwardly toward the bale wrapper.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a left side elevational view of the transporter having the wrapper apparatus mounted on the transporter bed for movement thereof from one location to another;

FIG. 7 is a left side elevational view of the transporter similar to that of FIG. 6 showing the wrapper apparatus engaged with only the rearward portion of the transporter bed such as to start a loading operation or finishing an unloading operation of the wrapper apparatus;

FIG. 8 is a left side elevational view of the transporter similar to that of FIG. 7, but showing the wrapper apparatus being pulled further on-board the transporter bed in a loading operation;

DETAILED DESCRIPTION OF THE PREFERRED EMBODIMENT

Figure 1:
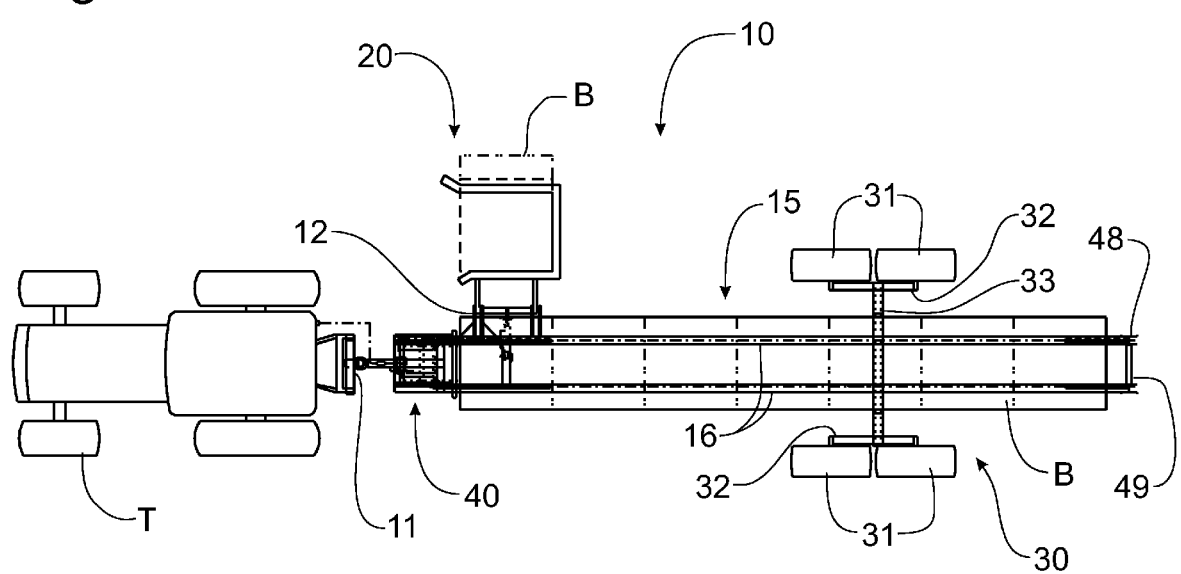
FIG. 1 is a top plan view of the transporter incorporating the principles of the instant invention, the transporter being shown connected to a tractor and as being loaded with a line of round bales depicted in phantom.
Figure 2:
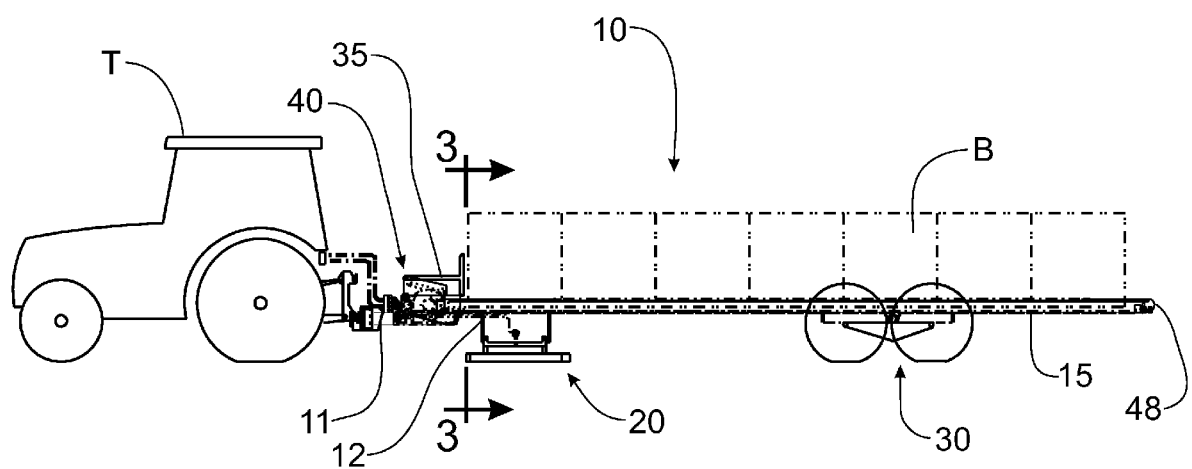
FIG. 2 is a side elevational view of the transporter connected to a tractor as shown in FIG. 1.
Figure 3:
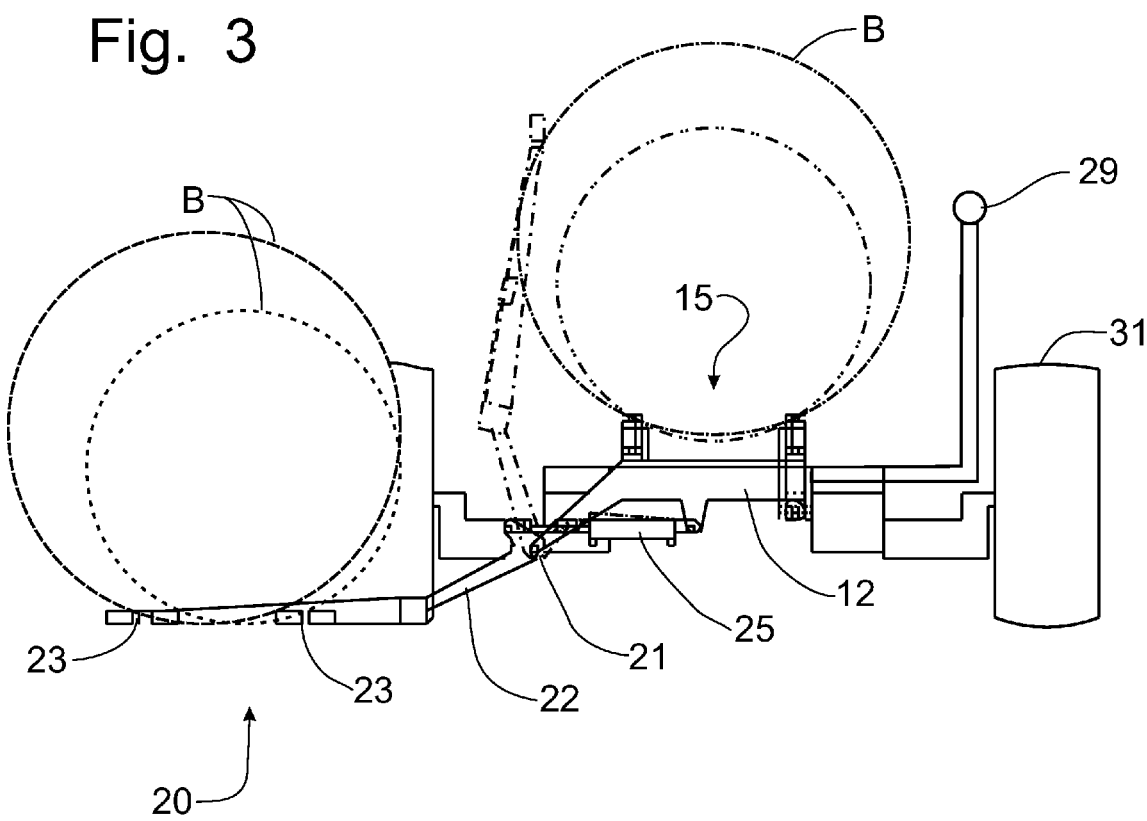
FIG. 3 is a partial cross-sectional view of the transporter corresponding to lines 3-3 with two differently sized round bales being depicted on the pick-up mechanism, the positioning of the round bales on the transporter being shown in phantom.

Referring to FIGS. 1-3, a transporter, incorporating the principles of the instant invention, for transporting large round bales of forage crop can best be seen. Any left, right front and rear references are used as a matter of convenience and are determined by standing at the rear of the transporter 10 facing the tractor T to which the transporter 10 is connected for motive and operative power. The transporter 10 is selectively connectable to a wrapper apparatus 50, as will be described in greater detail below, to transfer large round bales of forage crop through the wrapper apparatus 50 to cause a strip of plastic to be wrapped around the outer periphery of the bales for storage thereof. The transporter 10 is an implement that has a hitch 11 at the forward end thereof for connection to a tractor T in a conventional manner. The transporter 10 includes a transporter bed 15 supported on an axle mechanism 30 for movement over the surface of the ground G and a pick-up mechanism 20 mounted at the forward end of the transporter 10 offset to the right of the transporter 10 to engage large round bales of forage crop for elevation onto the transporter bed 15.

The forwardmost part of the transporter 10 includes the hitch 11 and a frame 12 connected thereto. The frame 12 supports a drive mechanism 40 that is connected to the tractor T and drives the operation of the transporter 10 and the wrapper apparatus 50. The drive mechanism 40 is preferably hydraulic, though the drive mechanism 40 could be mechanical over hydraulic with the power takeoff mechanism (not shown) of the tractor T driving an on-board hydraulic system for the transporter 10, or the drive mechanism could be completely mechanical. Typically, however, the tractor T can provide adequate hydraulic power from the hydraulic system onboard the tractor, represented by the hydraulic ports 41. The hydraulic lines connected to the tractor ports 41 are connected to a hydraulic valve 43 that is operable to divide and direct the flow of hydraulic fluid from the tractor T to the components as needed to operate the transporter 10 and the wrapper apparatus 50. The primary drive component for the transporter 10 is the hydraulic motor 45 that is operably connected to a gear reduction apparatus 46 to rotate the front drive shaft 49 of the conveyor 17 on the transporter bed 15.

The transporter bed 15 primarily consists of a pair of longitudinally extending rails 16 extending from the frame 12 at the front of the transporter 10 to the rearwardmost portion. Each rail 16 supports an endless chain conveyor 17 entrained around a drive sprocket 47 operatively connected to the gear reduction apparatus 46 to affect movement of the chain conveyor 17. Since the hydraulic motor 45 is operable in forward and reverse directions, the hydraulic motor 45 is operable to move the chain conveyor 17 both forwardly and rearwardly for the selective movement of bales on the transporter bed 15. The rails 16 are also supported by the axle mechanism 30 and terminate at the rearwardmost portion thereof in a driven sprocket 48. Both the opposing drive sprockets 47 and the driven sprockets 48 are coupled by transversely extending shafts 49 to keep the chain conveyors 17 moving in unison.

The pick-up mechanism 20 is pivotally supported from the frame 12 to be movable between a lowered engagement position, as shown in solid lines in FIG. 3, and a loading position, as shown in phantom in FIG. 3, to deposit the bale onto the transporter bed 15. The pick-up mechanism 20 includes a subframe 22 pivotally connected to the transporter frame 12 by a longitudinally extending pivot axis 21. The subframe 22 includes a pair of forwardly projecting tines 23 that are spaced transversely a sufficient distance to be positionable on transversely opposing sides of a round bale for support thereof while being elevated onto the transporter bed 15. A hydraulic cylinder 25, operably connected to the hydraulic valve 43 to receive hydraulic fluid under pressure therefrom, interconnects the transporter frame 12 and the subframe 22 to cause pivotal movement of the pick-up mechanism 20 about the pivot axis 21 relative to the transporter 10.

The transporter 10 includes a push gate 35 constructed with a push head 36 that is generally vertically oriented to engage the front surface of a bale B to push the bale rearwardly with the movement of the chain conveyor 17. A push arm 37 extends forwardly from the push head 36 and supports a frame that selectively connected to the conveyor chains 17 to move rearwardly therewith and push the bales B off the transporter 10 into the wrapper apparatus 50. When activation of the push gate 35 is desired, the push gate 35 is connected to the conveyor chain 17 into a driving engagement therewith so that the push gate 35 will move with the conveyor chain 17.

Figure 4:
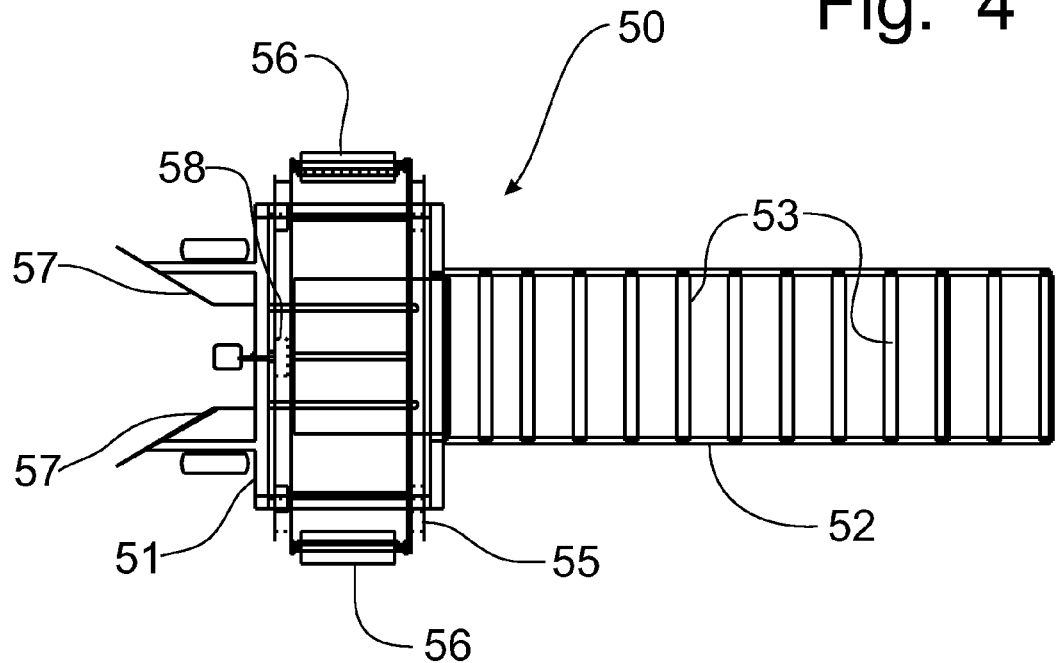
FIG. 4 is a top plan view of the wrapper apparatus incorporating the principles of the instant invention.
Figure 5:
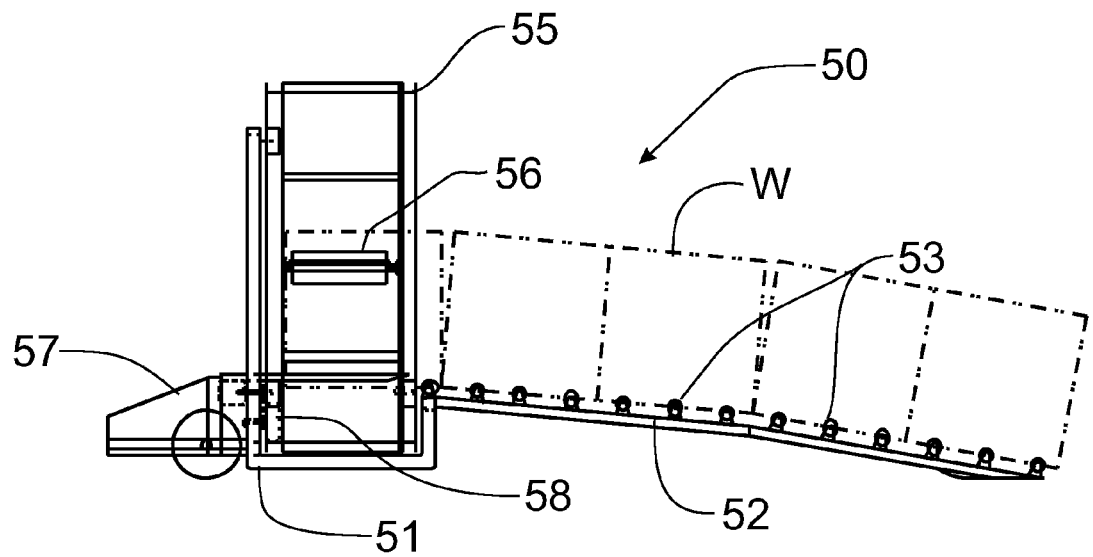
FIG. 5 is a left side elevational view of the wrapper apparatus, representative bales being wrapped being shown in phantom.
Figure 9:
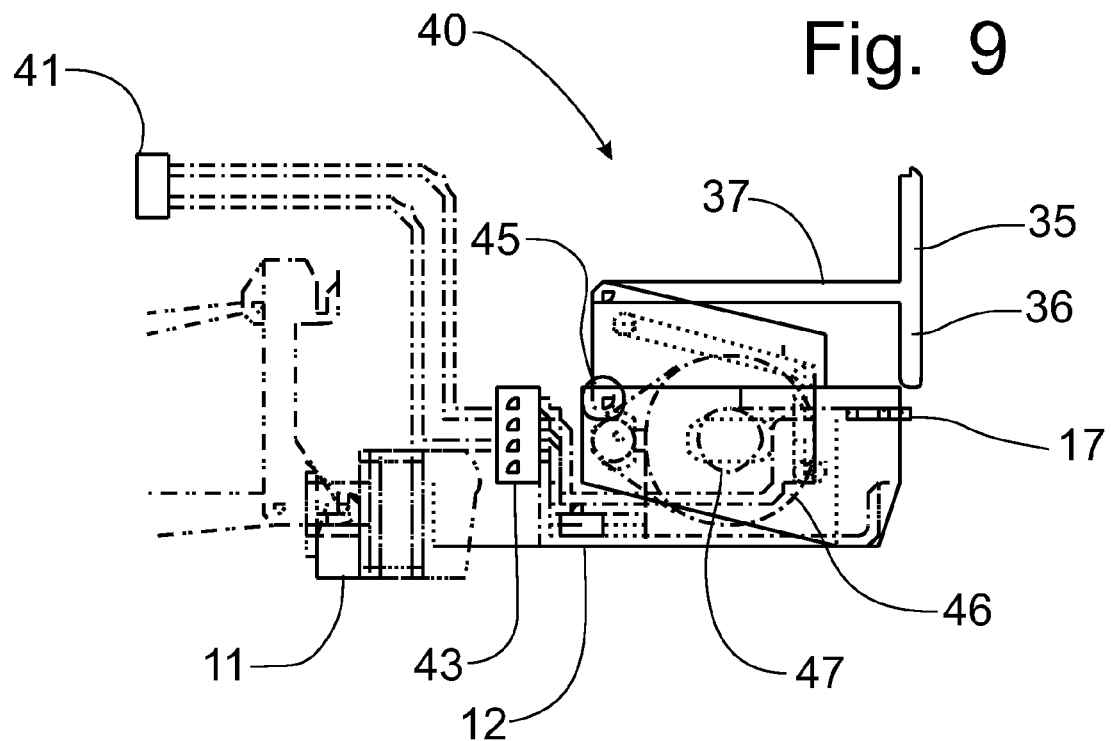
FIG. 9 is a partial left side elevational view of the forward portion of the transporter to depict the hitch and the drive components connected to the tractor.
Figure 10:
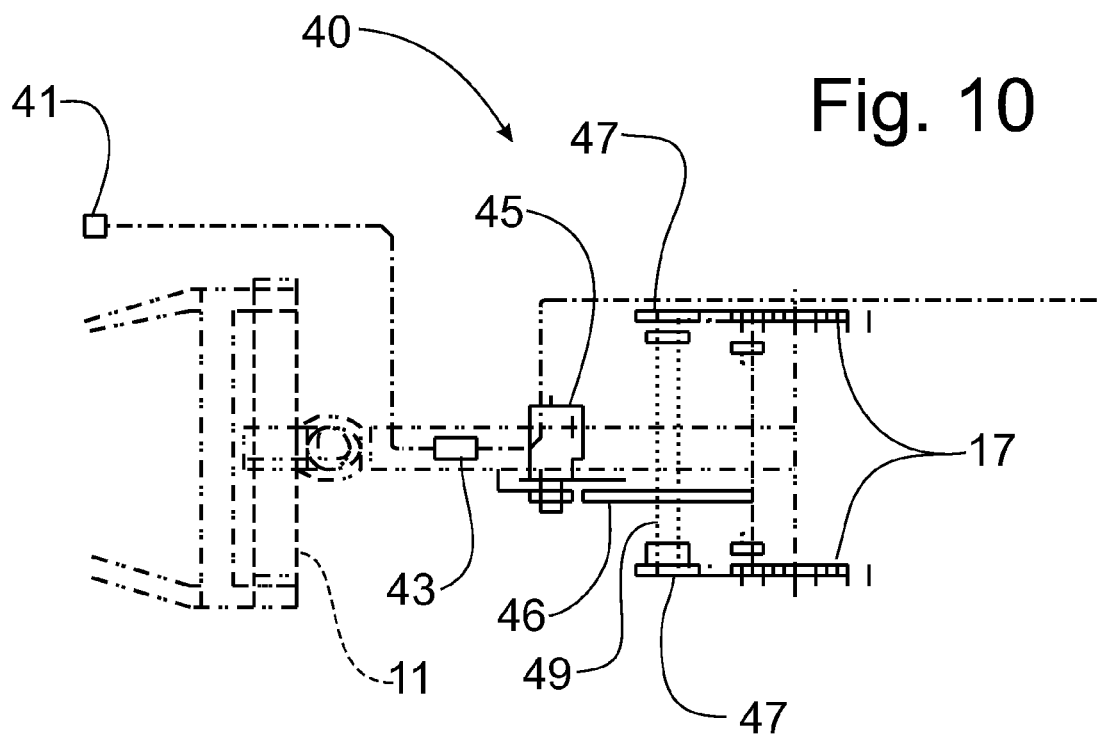
FIG. 10 is a partial top plan view of the forward portion of the transporter corresponding to FIG. 9.

The wrapper apparatus 50 is best seen in FIGS. 4 and 5 and consists primarily of a frame supported a longitudinally extending ramp 52 having rollers 53 mounted therein to support wrapped bales W, and a circular hoop 55 containing a plastic wrapping mechanism 56 that orbits around the circular hoop 55 to wrap a strip of plastic around the bales B as they pass rearwardly through the hoop 55 and onto the ramp 52. The general operation of the wrapper apparatus 50 is known in the art, as disclosed in U.S. Pat. No. 4,793,124, and does not need to be described herein. Some significant differences exist, however, in the wrapper apparatus 50 compared to that disclosed in the aforementioned U.S. Pat. No. 4,793,124, primarily in the mechanism for powering the operation of the wrapper apparatus 50. Commercially, most such wrapping machines carry their own engine to provide operative power for the movement of the wrapping mechanism. The operative power for the wrapping mechanism 56 in the instant invention comes from the transporter 10, via the tractor T. One such possible drive mechanism would be hydraulic lines carried rearwardly by the transporter 10 for connection with a hydraulic motor (not shown) carried by the wrapper apparatus 50.

Since the wrapper apparatus 50 has no on-board power generating devices, the wrapper mechanism 50 must be transported to the job site. The conventional manner of getting the wrapper apparatus 50 to the field to wrap bales of forage crop is to attach the wrapper apparatus to a second tractor or a pick-up truck that will tow the wrapper apparatus (mounted for movement on a wheeled axle) from place to place. This conventional manner of bringing the wrapper apparatus to the job site requires an additional source of motive power and another person to operate that machine. The transporter 10, as can be seen in FIGS. 6-8, is operable to load the wrapper apparatus 50 onto the transporter bed 15 for transportation from one location to another.

The fully loaded wrapper apparatus 50 is shown in FIG. 6 in the orientation in which the transporter 10 carries the wrapper apparatus 50 to the job site where the wrapper apparatus 50 is unloaded at the site desired for storage or wrapped bales, and then the transporter 10 is free to move about the field collecting bales of forage crop. Loading the wrapper apparatus 50 onto the transporter bed 15 starts with a connection of the transporter conveyor 17 to the wrapper frame 51 and simultaneously operating the conveyor 17 in a forward direction and backing the transporter 10 into the wrapper apparatus 50 until projections (not shown) on the wrapper frame 51 engage the conveyor chain 17. Once engaged, the rearward movement of the transporter 10 ceases and the conveyor 17 draws the wrapper apparatus 50 onto the transporter bed 15, as is reflected in FIG. 7. The continued forward movement of the conveyor chains 17, as is depicted in FIG. 8, brings the wrapper apparatus 50 along the transporter bed 15 until fully loaded, as is reflected in FIG. 6.

Unloading the wrapper apparatus 50 is simply done the opposite way by moving the conveyor chains 17 rearwardly until the wrapper apparatus 50 is discharged off the transporter bed 15. One skilled in the art will recognize that the transporter 10 should be moved forwardly as the wrapper apparatus 50 engages the ground behind the transporter 10 as the wrapper apparatus 50 has no wheeled support. The projections (not shown) on the wrapper apparatus 50 that are engaged with the conveyor chain 17 are pushed out of engagement with the conveyor chain 17 as the projections pass over the rear sprockets 48. Thus, the wrapper apparatus 50 can be discharged off the rearward end of the transporter bed 15 for positioning where the wrapper apparatus 50 can wrap bales in plastic as described in detail below.

In operation, the transporter 10 carries the wrapper apparatus 50 on top of the transporter bed 15 to the job site where the wrapped bales are intended to be stored. The wrapper apparatus 50 is then unloaded from the transporter bed 15 and positioned for subsequent operation. The transporter 10 is then free to move about the field collecting large round bales of forage crop. As is described above, each round bale B is engaged with the pick-up mechanism 20 and then elevated onto the transporter bed 15. Once placed on the transporter bed 15 opposite the pick-up mechanism 20, the hydraulic motor 45 is operated to drive the conveyor chains 17 to index the bale B rearwardly one bale length. The next bale B is then collected and elevated onto the transporter bed 15 adjacent the first bale. Then the conveyor chains 17 are operated again to advance the collected bales rearwardly one bale length. This process is repeated until the entire transporter bed 15 is loaded with collected bales B.

The loaded transporter 10 is then driven by the tractor T to the wrapper apparatus 50. The rearwardmost end of the transporter 10 is then backed toward the center of the wrapper apparatus 50 until contact is made. Drive connection between the transporter 10 and the wrapping apparatus 50 is made, such as by coupling the tractor hydraulic system to the hydraulic drive mechanism (not shown) on the wrapper apparatus 50. One skilled in the art will recognize that the connection of the wrapper apparatus 50 to the tractor through an apparatus carried by the transporter 10 enables the wrapper apparatus 50 to be constructed without an on-board power-generating mechanism, such as an engine, as the power for driving the wrapper apparatus 50 ultimately comes from the tractor T.

The push gate 35 is selectively connected to the conveyor chains 17 to help move bales from the transporter bed 15 into the wrapper apparatus 50 by pushing the round bales along the transporter bed 15. Once the transporter 10 has been properly coupled with the wrapper apparatus 50, the push gate 35 can be connected to the conveyor chains 17 and the push gate 35 and conveyor chains 17 are driven rearwardly to move the bales that had been loaded on the transporter bed 15 toward the wrapper apparatus 50.

The above-described operation of collecting bales from the field, backing the transporter 10 into the wrapper apparatus 50, and moving the bales from the transporter 10 into the wrapper hoop 55, then disconnecting and returning to the field is repeated until the desired number of bales have been wrapped. Once the desired number of bales has been wrapped and discharged from the bale wrapper, the operator reverses the transporter conveyor 17 to return the push gate 35 to the front of the transporter bed 15. A length of tube (not shown) is manually positioned between the push gate 35 and the end of the last wrapped bale within the wrapper hoop 55, and the stretch film is detached from that bale. The operator then drives the push plate 35 and the conveyor chains 17 rearwardly, pushing the wrapper apparatus 50 out from under the wrapped bales. Thereafter, the wrapper apparatus 50 can be loaded onto the transporter 10 as described above.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention.

Having thus described the invention, what is claimed is:

1. A method of transporting and wrapping large bales of forage material, comprising the steps of:

transporting a bale wrapper having an operative function powered by a drive mechanism in a first inoperative position on top of an elongated transporter bed having longitudinally extending rails with a bale conveying mechanism associated with said rails;

off-loading said bale wrapper at a selected job site;

loading said large bales as an non-operative cargo onto said rails on said transporter and returning to said selected job site;

connecting said bale wrapper to said transporter in a second operative position different from said first inoperative position, said second operative position permitting said bale wrapper to receive large bales from said elongated transporter;

powering said drive mechanism such that said operative function can be driven to wrap plastic material around a periphery of said large bales;

discharging said large bales from said transporter into said bale wrapper as said operative function is driven by said drive mechanism; and after said transporter has discharged all of said large bales loaded on said rails, disconnecting said bale wrapper from said transporter and de-powering said drive mechanism.

2. The method of claim 1 wherein said connecting step includes the steps of:

physically connecting said bale wrapper to said transporter; and operatively connecting said bale wrapper to a drive mechanism carried by said transporter to power the operation of said bale wrapper in wrapping plastic material around said large bales.

3. The method of claim 2 wherein said transporting step includes the step of:

loading said bale wrapper onto said transporter bed by connecting said bale wrapper to said bale conveying mechanism and operating said bale conveying mechanism in a forward direction.

4. The method of claim 3 wherein said off-loading step includes the steps of:

operating said bale conveying mechanism in a rearward direction until said bale wrapper is discharged off the rearward end of said transporter bed; and disengaging said bale wrapper from said bale conveying mechanism to separate said bale wrapper from said transporter for subsequent operation of said bale wrapper.

5. The method of claim 1 further comprising the steps of:

after said disconnecting step, affixing said bale wrapper to said bale conveying apparatus;

running said bale conveying apparatus in a forward direction to draw said bale wrapper unto said rails; and pulling said bale wrapper fully onto said rails to carry said bale wrapper in said first inoperative position to a new job site.

6. A method of transporting and wrapping large bales of forage material, comprising the steps of:

transporting a bale wrapper to a selected job site;

loading said large bales onto said rails on a transporter including an elongated transporter bed having longitudinally extending rails with a bale conveying mechanism and returning to said selected job site;

physically connecting said bale wrapper to said transporter;

operatively connecting said bale wrapper to a drive mechanism carried by said transporter to power the operation of said bale wrapper in wrapping plastic material around said large bales;

discharging said large bales from said transporter into said bale wrapper, said bale wrapper being operable to wrap plastic material around a periphery of said large bales; and after said transporter has discharged all of said large bales loaded on said rails, disconnecting said bale wrapper from said transporter both physically and operatively.

7. The method of claim 6 wherein said transporting step includes the steps of:

hauling said bale wrapper on top of said elongated transporter bed; and off-loading said bale wrapper from said transporter bed at said selected job site.

8. The method of claim 7 wherein said hauling step includes the steps of:

connecting said bale wrapper to said bale conveying mechanism; and operating said bale conveying mechanism in a forward direction.

9. The method of claim 8 wherein said off-loading step includes the steps of:

operating said bale conveying mechanism in a rearward direction until said bale wrapper is discharged off a rearward end of said transporter bed; and disengaging said bale wrapper from said bale conveying mechanism to separate said bale wrapper from said transporter for subsequent operation of said bale wrapper to load large bales onto said transporter bed.

10. The method of claim 1 further comprising the steps of:

after said disconnecting step, affixing said bale wrapper to said bale conveying apparatus;

running said bale conveying apparatus in a forward direction to draw said bale wrapper unto said rails; and pulling said bale wrapper fully onto said rails to carry said bale wrapper to a new job site.

11. A method of transporting and wrapping large bales of forage material, comprising the steps of:

transporting a bale wrapper on top of an elongated transporter bed having longitudinally extending rails with a bale conveying mechanism associated with said rails;

off-loading said bale wrapper at a selected job site;

loading said large bales onto said rails on a transporter and returning to said selected job site;

physically connecting said bale wrapper to said transporter;

operatively connecting said bale wrapper to a drive mechanism carried by said transporter to power the operation of said bale wrapper in wrapping plastic material around said large bales;

discharging said large bales from said transporter into said bale wrapper, said bale wrapper being operable to wrap plastic material around a periphery of said large bales; and after said transporter has discharged all of said large bales loaded on said rails, disconnecting said bale wrapper from said transporter both physically and operatively.

12. The method of claim 11 wherein said transporting step includes the steps of:

connecting said bale wrapper to said bale conveying mechanism; and operating said bale conveying mechanism in a forward direction to draw said bale wrapper onto said transporter bed.

13. The method of claim 11 wherein said off-loading step includes the steps of:
  operating said bale conveying mechanism in a rearward direction until said bale wrapper is discharged off the rearward end of said transporter bed; and
  disengaging said bale wrapper from said bale conveying mechanism to separate said bale wrapper from said transporter for subsequent operation of said bale wrapper.

14. The method of claim 11 further comprising the steps of:
  after said disconnecting step, affixing said bale wrapper to said bale conveying apparatus;
  running said bale conveying apparatus in a forward direction to draw said bale wrapper unto said rails; and
  pulling said bale wrapper fully onto said rails to carry said bale wrapper to a new job site.

15. A method of transporting and wrapping large bales of forage material, comprising the steps of:
  loading a bale wrapper onto an elongated bed of a transporter by mechanically connecting said bale wrapper to a bale conveying mechanism on said transporter and operating said bale conveying mechanism in a forward direction to pull said bale wrapper onto said elongated bed from a rearward end of said transporter;
  transporting said bale wrapper on top of said transporter bed to a selected job site;
  off-loading said bale wrapper at said selected job site by operating said bale conveying mechanism in a rearward direction until said bale wrapper is discharged off the rearward end of said transporter and disconnecting said bale wrapper from said bale conveying mechanism;
  loading said large bales onto said rails on said transporter and returning to said selected job site;
  connecting said bale wrapper to said transporter to permit said bale wrapper to receive said large bales from said elongated transporter;
  discharging said large bales from said transporter into said bale wrapper, said bale wrapper being operably driven to wrap plastic material around a periphery of said large bales as said large bales are discharged through said bale wrapper; and
  after said transporter has discharged all of said large bales loaded on said rails, disconnecting said bale wrapper from said transporter.

16. The method of claim 15 wherein said loading step includes a simultaneous operation of said bale conveying mechanism and a rearward movement of said transporter bed to draw said bale wrapper onto the top of said transporter bed.

17. The method of claim 15 wherein said loading step further includes a continued forward movement of said bale conveying mechanism after said bale wrapper has been drawn onto the top of said transporter bed to locate said bale wrapper at a first inoperative position completely supported on top of said transporter bed.

18. The method of claim 17 wherein said off-loading step includes the steps of:
  operating said bale conveying mechanism in a rearward direction until said bale wrapper is discharged off the rearward end of said transporter bed; and
  disengaging said bale wrapper from said bale conveying mechanism to separate said bale wrapper from said transporter for subsequent operation of said bale wrapper.

19. The method of claim 18 wherein said connecting step includes the steps of:
  physically connecting said bale wrapper to said transporter at a second operative location at a rear portion of said transporter bed; and
  operatively connecting said bale wrapper to a drive mechanism carried by said transporter to power the operation of said bale wrapper in wrapping plastic material around said large bales.

20. The method of claim 19 further comprising the steps of:
  after said disconnecting step, affixing said bale wrapper to said bale conveying apparatus;
  running said bale conveying apparatus in a forward direction to draw said bale wrapper unto said rails; and
  pulling said bale wrapper fully onto said rails to carry said bale wrapper in said first inoperative position to a new job site.

* * * * *